United States Patent
Ghiggino et al.

(10) Patent No.: US 7,218,832 B2
(45) Date of Patent: May 15, 2007

(54) EYE-DIAGRAM MASK FOR OPTICAL PULSES

(75) Inventors: Pierpaolo Ghiggino, Leamington Spa (GB); Alfredo Palagi, La Spezia (IT)

(73) Assignee: Marconi Communications SpA, Genoa (IT)

( * ) Notice: Subject to any disclaimer, the term of this patent is extended or adjusted under 35 U.S.C. 154(b) by 165 days.

(21) Appl. No.: 10/380,813

(22) PCT Filed: Sep. 28, 2001

(86) PCT No.: PCT/GB01/04344

§ 371 (c)(1),
(2), (4) Date: Aug. 18, 2003

(87) PCT Pub. No.: WO02/30074

PCT Pub. Date: Apr. 11, 2002

(65) Prior Publication Data

US 2004/0022486 A1   Feb. 5, 2004

(30) Foreign Application Priority Data

Oct. 3, 2000    (IT) .......................... TO2000A0917

(51) Int. Cl.
G02B 6/00     (2006.01)
H04L 25/03    (2006.01)
G02B 6/10     (2006.01)

(52) U.S. Cl. ........................................ 385/147; 385/31

(58) Field of Classification Search .................. 385/24; 398/159
See application file for complete search history.

(56) References Cited

U.S. PATENT DOCUMENTS 5,208,817 A * 5/1993 Kao et al. ...................... 372/26
5,438,593 A * 8/1995 Karam et al. ................ 375/317
5,532,868 A * 7/1996 Gnauck et al. ............. 359/332
5,724,178 A * 3/1998 Grandpierre et al. ....... 359/289
6,330,381 B1 * 12/2001 Lu et al. ...................... 385/24

OTHER PUBLICATIONS

Hui et al, Separation of Noise from Distortion for High-Speed Optical Fiber System Link Budgeting, Jul. 1999, IEEE Photonics Technology Letters, vol. 11, No. 7, pp. 910-912.*
Gee, et al., "*Performance of an SC duplex transceiver for 2.5 Gbit/s with clock and data recovery*", Electronic Components and Technology Conference, 1999, Jun. 1-4, 1999, pp. 201-206.
Lum, M, "*Making 'Mid-Fibre Meet' A Reality*", Communications International, vol. 22, No. 6, Jun. 1, 1995, pp. 61-62, 64.
Brosio, A., et al., "*Transmission Experiments at 34 Mbit/s on Optical Fibres with HBD 3 Line Code*", Proceedings of the European Conference on Optical Communication, vol. 19, No. 9, Sep. 17, 1979, pp. 1-4.

* cited by examiner

*Primary Examiner*—Sung Pak
(74) *Attorney, Agent, or Firm*—Kirschstein, et al.

(57) ABSTRACT

In an optical data transmission system, high frequency pulsed optical signals are transmitted along an optical fiber. These pulses are attenuated and distorted by transmission over long optical fibers making detection of data difficult at the receiving end. The allowable pulse profile is determined by an eye diagram which is non-symmetrical with respect to logic 1 and 0 levels. By positioning the eye diagram closer to the logic 0 level, detection in the presence of noise introduced during transmission of the optical pulses, can be significantly improved.

6 Claims, 2 Drawing Sheets

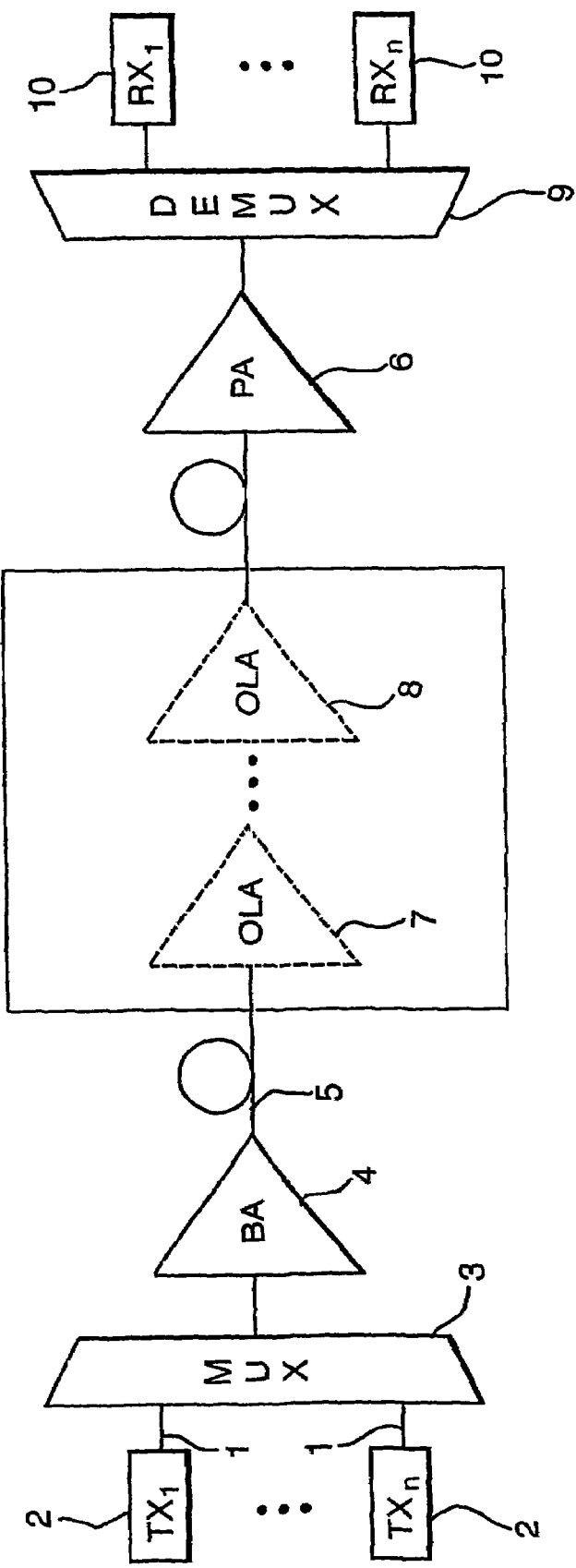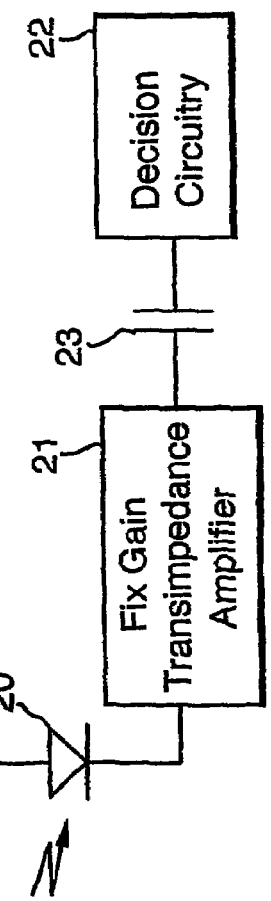

EYE-DIAGRAM MASK FOR OPTICAL PULSES

This invention relates to an optical transmission system, and more particularly in which a modulated optical signal is transmitted over an optical fibre. When a modulated optical signal is amplitude modulated at a very high frequency, to form a succession of pulses which represent information, for transmission over a long distance over an optical fibre, the light pulses are distorted and attenuated by the transmission process, and the degree of attenuation and distortion which permits recovery of the information at the far end of the optical fibre determines the maximum distance over which the information can be sent without amplification. Optical amplifiers can be provided at intervals along the fibre, but these introduce a degradation in the optical signal to noise ratio (OSNR) due to amplified spontaneous emitted (ASE) noise introduced by the optical amplifiers.

If the bit error rate (BER) is too high for a particular length of link, the problem may simply be tackled by reducing the length of spans between signal regeneration at which the optical signal is converted to an electrical signal and reshaped. This causes an increase in costs because more regenerator sites are needed, and this can greatly increase costs and complexity for a system which transmits dense wavelength division multiplex signals (DWDM) in which a single optical fibre carries a large number of separate light channels each having a different wavelength (colour). Alternatively, one could provide an optical receiver at the far end of the optical fibre having an adjustable decision threshold, but this requires modifications to the receiver which would greatly increase cost and complexity.

The article, Gee et al, 'Performance of an SC Duplex Transmitter for 2.5 Gbit/s with clock and data recovery' Electronic Components and Technology Conference Jun. 1–4 1999, pp 201–206, IEEE, describes an eye diagram of transmitted optical pulses in which the eye mask is positioned centrally with respect to the two logic states of these pulses.

The present invention seeks to provide an improved optical transmission system. According to this invention, an optical transmission system includes means for generating and transmitting optical pulses having logic one and zero levels along an optical fibre, in which the eye diagram of the optical pulses includes an eye mask, characterised in that the mean amplitude of the eye mask is closer to the logic zero level than the logic one level, and means for receiving the optical pulses at the far end of the optical fibre, the amplitude characteristic of the eye mask being arranged to facilitate detection of the logic one and logic zero levels at the receiving means in the presence of noise introduced during transmission of said pulses.

Preferably the system includes means for generating and transmitting optical pulses at a rate of 3 Gb/s or less and having logic one and logic zero levels along an optical fibre, in which the eye diagram of the optical pulses includes an eye mask which is of rectangular shape, and which has an upper limit of 0.65 of the logic one level, and a lower limit of 0.15 of the logic zero level.

In practice, the standard nominal bit rate is 2.5 Gb/s, which is an actual bit rate 2.48832 Gb/s, but it may be desirable to incorporate, for example, forward error correction, and this requires the insertion of additional bits into the bit stream which increases the optical pulse rate above the nominal value of 2.5 Gb/s. The figure of 3 Gb/s is selected so as to allow for an increase in the bit rate above its nominal, standard, value.

Preferably the eye mask is a rectangle having a time position centred on the peak amplitude position of an optical pulse. Preferably again, the length (duration) of the eye mask is 0.2 of the eye diagram bit interval.

The pulses received at the far end of the optical fibre, are preferably converted to an electrical signal and detected by threshold decision means which is a.c. coupled to a preceding conversion means. This results in a mean pulse level which is determined by the pulse profile.

The invention is further described by way of example with reference to the accompanying diagrams in which:

FIG. 1 illustrates an optical transmission system,

FIG. 2 shows part of the system in more detail, and

Figure 3:
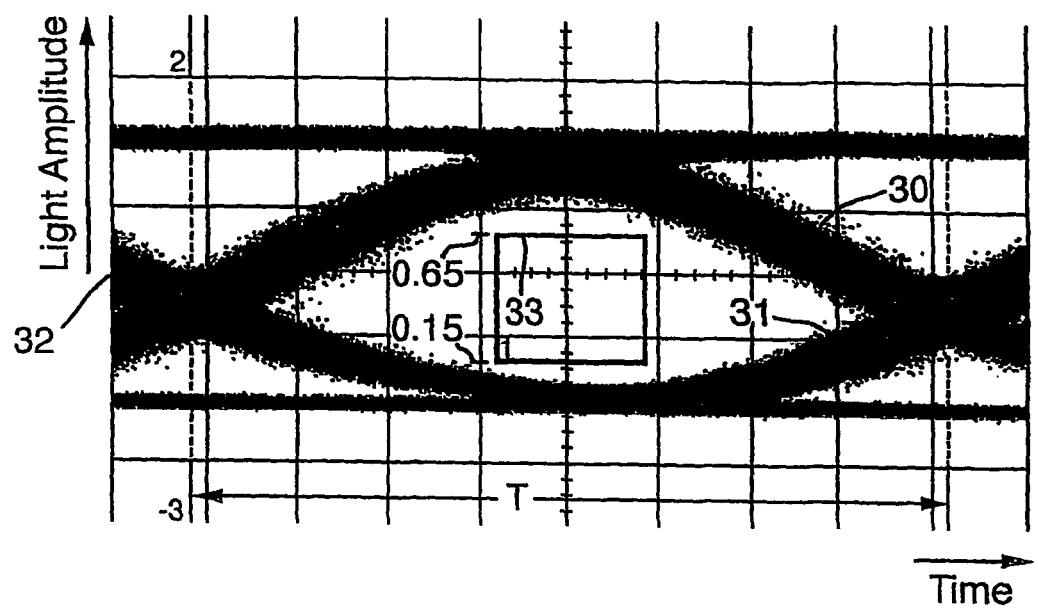
FIGS. 3 and 4 are explanatory diagrams.

Referring to FIG. 1, there is shown therein an n-channel DWDM optical transmission system. The system consists of n optical channels 1 which are generated at individual optical transmitters 2. Each optical channel is a light signal which is modulated with traffic and overhead information, and in a DWDM system a large number n of optical channels are provided with each channel having a different optical carrier wavelength. The adjacent wavelengths can be closely spaced, and may be spaced regularly apart over the available spectrum.

The n-channels are combined at a multiplexer 3, where the individual carrier wavelengths are preserved, and transmitted via a booster amplifier 4 over an optical fibre 5 to a pre-amplifier 6 of a receiver. The optical fibre may be part of a very long haul transmission system eg of the order of 600 km, and to boost the signal level optional optical line amplifiers 7, 8 may be provided as necessary.

The received optical signal is fed to a demultiplexer 9, where each of the individual optical carriers is separated out and passed to an individual receiver 10, where the traffic and overhead information can be recovered and used as required.

Each optical carrier has a very high frequency, and can transmit data as a string of light pulses at a very high repetition rate, e.g., at 2.48832 Gb/s (i.e., the nominal 2.5 Gb/s rate) or higher. The actual bit rate of the light pulses can be higher than the nominal value if additional error correction bits are inserted into the bit stream for the purpose of error correction. One forward error correction technique increases the bit rate by the ratio 15/14, but alternative techniques may cause a greater or lesser increase with a value of 3 Gb/s providing an expected upper limit. At bit rates of this order, the shape of these pulses is modified and degraded during transmission along the optical fibre 5. This degradation can be caused by the optical fibre itself, and by the optical amplifiers used which generate amplified spontaneous emission of noise which adversely affects the signal to noise ratio. Each of these effects gives rise to a noisy signal and an increased bit error rate at the receiver.

In order to reduce the bit error rate, it has been proposed to reduce the lengths of spans between amplification, and to reduce the number of spans before regeneration which involves an optical-to-electrical signal conversion. This has the disadvantage of an increase in the costs of the system, and more regenerator sites are required, and the cost penalty of regeneration in DWDM applications with a large number of channels can be severe.

Alternatively, in order to reduce the bit error rate, the decision threshold level at the receiver may be adaptable to produce an optimum bit error rate. Considerable modifications would be needed at the optical receivers to adjust the threshold level to allow for different values of input power.

Instead the invention utilises a transmitted optical modulation and a receiver having a fixed decision characteristic selected with regard to the characteristics of the transmitted pulses.

FIG. 2 shows part of the receiver in more detail. Only a single channel receiver RX is shown, but the arrangement would be replicated for all optical channels. The light at the input of the receiver RX is detected by an optical-to-electrical detector 20, and the resulting pulsed signal is fed via a fixed gain trans-impedance amplifier 21 to decision circuitry 22 via a capacitor 23 which a.c. couples the circuitry 22 to the detector 20 and amplifier 21.

The pulse shape of the optical signals transmitted by the transmitter is shown in FIG. 3, which illustrates a so-called eye diagram, in which pulse amplitude is plotted against time. A logic 1 pulse shape 30 is shown superimposed on a logic 0 pulse shape 31, and it will be seen that the pulse shapes are asymmetrical with respect to the amplitude mid-point 32, that is to say there is a reduction in the duty cycle of the pulses. The permissible position of the pulse shapes is defined by the rectangular eye mask 33, which is offset from the mid-point 32, and this rectangle 33 determines the limit of the shape of the pulses which are transmitted, as neither a logic 1 pulse or a logic 0 pulse may intrude on the area defined by the rectangle.

If the nominal logic 0 value is zero, and the nominal logic 1 value is unity, the upper level of the rectangle has a value of 0.65 and the lower level a value of 0.15. The duration of the eye diagram is T, which corresponds to a single pulse length. The duration of the eye mask is 0.2 T.

In FIG. 2, the amplifier 21 is capacitively a.c. coupled to the decision circuit 22 by the capacitor 23, and the electrical signal which is obtained from the optical-to-electrical signal conversion is biased at the input of the decision circuit 22 around the threshold level—this means that the threshold level and the mean level of the incoming signal are the same.

The duty cycle $\gamma$ of the optical signal is $$\gamma = \frac{t_1}{2T}$$

where $t_1$ is the time during which the signal is above its mean level and T is the bit interval, as shown in FIG. 3.

Figure 4:
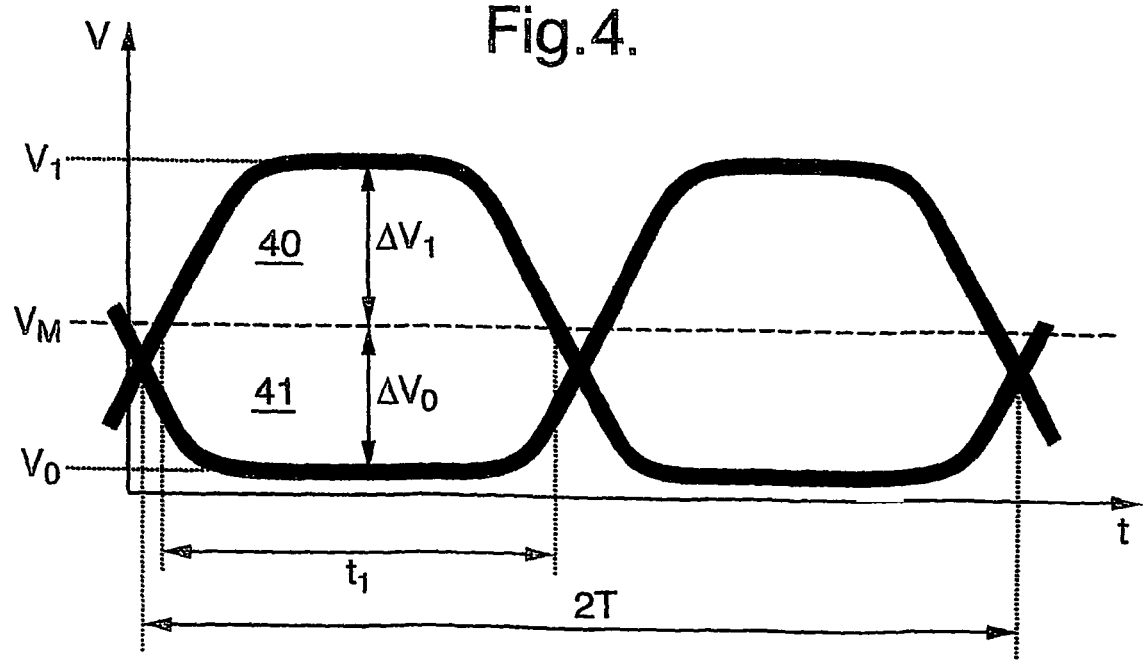

In an optical transmission signal the probability of sending a logic one generally equals the probability of sending a logic zero because the signal is scrambled before transmission in order to maintain 0.5 the probability of each symbol. A signal profile in accordance with the invention is shown in FIG. 4, in which, for the above conditions, the mean value $V_M$ of the signal is that for which the two areas 40, 41 are equal.

To maintain equal the two areas when $\gamma$ is lower than 50%, $\Delta V_1$ must become greater than $\Delta V_0$. If the electrical signal is biased across the decision level that distinguishes logical ones from logical zeros (which is commonly the case in AC coupled receivers of which that shown in FIG. 2 is an example) the logical ones are moved further away from the threshold level $V_M$ by altering the characteristic of the transmitted signal and without the need to modify the receiver.

This way of biasing the electrical signal is auto adaptive and it is not affected by variation of the input optical power because the mean level of the signal does not change (the signal is AC coupled) and even if the peak to peak amplitude changes the ratio $\Delta V_1/\Delta V_0$ is constant because it is related to the value of $\gamma$ (a parameter of the transmitter, independent on the received power).

The invention claimed is:

1. An optical transmission system, comprising:
   a) an optical transmitter for generating and transmitting optical pulses having logic one and logic zero levels along an optical fiber, a shape of the optical pulses which are transmitted being defined by an eye diagram, the pulse shapes for the logic one and logic zero levels being asymmetrical with respect to an amplitude mid-point such that a duty cycle of the pulses is reduced; and
   b) a receiver for receiving the optical pulses at a far end of the optical fiber, and means for utilizing an eye mask to facilitate detection of the logic one and logic zero levels in a presence of noise introduced during transmission of the optical pulses, wherein the eye mask has a mean amplitude which is closer to the logic zero level than to the logic one level.

2. The optical transmission system as claimed in claim 1, wherein the optical transmitter generates and transmits pulses at a rate of 3 Gb/s or less.

3. The optical transmission system as claimed in claim 1, wherein the eye mask is of rectangular shape and has an upper limit of approximately 0.65 of the logic one level, and a lower limit of approximately 0.15 of the logic zero level.

4. The optical system as claimed in claim 1, wherein the eye mask is a rectangle having a time position centered on a peak amplitude position of one of the optical pulses.

5. The optical system as claimed in claim 1, wherein the eye mask has a time duration which is 0.2 of a bit interval of the eye diagram.

6. The optical system as claimed in claim 1, and a converter for converting the pulses received at the far end of the optical fiber to an electrical signal, and threshold decision means for detecting the pulses, the threshold decision means being AC coupled to the converter.

* * * * *